US008631177B1

(12) United States Patent
Thomas

(10) Patent No.: US 8,631,177 B1
(45) Date of Patent: Jan. 14, 2014

(54) MULTI-PORT DEVICE WITH CONTROLLER FOR STORAGE MEDIA DEVICE PORT

(75) Inventor: Christopher Thomas, San Diego, CA (US)

(73) Assignee: SMSC Holdings S.A.R.L., Luxembourg (LU)

( * ) Notice: Subject to any disclaimer, the term of this patent is extended or adjusted under 35 U.S.C. 154(b) by 235 days.

(21) Appl. No.: 12/822,956

(22) Filed: Jun. 24, 2010

(51) Int. Cl.
*G06F 13/00* (2006.01)
*G06F 3/00* (2006.01)

(52) U.S. Cl.
USPC ............ 710/110; 710/72; 710/73; 710/74; 713/375

(58) Field of Classification Search
USPC ......... 710/31, 33, 301, 303, 110; 365/189.03, 365/230.05; 709/208–211; 713/375
See application file for complete search history.

(56) References Cited

U.S. PATENT DOCUMENTS

| 5,784,581 | A | 7/1998 | Hannah |
| 6,058,441 | A | 5/2000 | Shu |
| 6,522,581 | B2 * | 2/2003 | Takata et al. ............. 365/185.05 |
| 7,782,683 | B2 * | 8/2010 | Sohn et al. ................ 365/189.2 |
| 7,907,469 | B2 | 3/2011 | Sohn et al. |
| 8,200,473 | B1 | 6/2012 | Dropps et al. |
| 2004/0148450 | A1 | 7/2004 | Chen et al. |
| 2010/0076616 | A1 * | 3/2010 | Kagan .......................... 700/295 |

* cited by examiner

*Primary Examiner* — Tammara Peyton
(74) *Attorney, Agent, or Firm* — King & Spalding L.L.P.

(57) ABSTRACT

Various techniques are provided for hosting storage media devices using multi-port devices having a plurality of ports. For example, in one embodiment, a method of operating a multi-port device includes detecting whether a host device or a storage media device is connected to a first port of the multi-port device or a second port of the multi-port device. The method also includes, if the host device is connected to the first port, configuring the first port as a slave port and operating the multi-port device as a slave hosted by the host device. The method also includes, if the host device is connected to the second port and the storage media device is connected to the first port, configuring the first port as a host port and hosting the storage media device from the multi-port device.

23 Claims, 2 Drawing Sheets

MULTI-PORT DEVICE WITH CONTROLLER FOR STORAGE MEDIA DEVICE PORT

BACKGROUND

1. Field of the Invention

The present invention generally relates to the interfacing of external devices with host devices and, more particularly, to the hosting of storage media devices.

2. Related Art

As is well known, various types of interfaces (e.g., ports) may be used to facilitate data communication between host devices (e.g., computers or other devices) and external devices (e.g., hard drives or other devices). In particular, Universal Serial Bus (USB) ports have become a common way to attach hard drives and other types of external storage media devices to host computer systems with high performance. Other ports, such as external Serial Advanced Technology Attachment (eSATA) ports, Firewire (e.g., IEEE 1394) ports, or others may also be used. In this regard, some external storage media devices may be equipped with more than one type of port. For example, certain external storage media devices may include USB ports and eSATA ports.

However, such devices are typically configured to operate only as slaves to other external host devices. For example, if an external host device is connected to a USB port of the external storage media device, then a remaining eSATA port of the external storage media device may remain unused. Such approaches fail to efficiently utilize the various ports of the external storage media device. Accordingly, there is a need for an improved approach for interfacing external storage media devices in a more efficient and useful manner.

SUMMARY

Various techniques are provided for hosting storage media devices using multi-port devices having a plurality of ports. For example, in one embodiment, a method of operating a multi-port device includes detecting whether a host device or a storage media device is connected to a first port of the multi-port device or a second port of the multi-port device; if the host device is connected to the first port, configuring the first port as a slave port and operating the multi-port device as a slave hosted by the host device; and if the host device is connected to the second port and the storage media device is connected to the first port, configuring the first port as a host port and hosting the storage media device from the multi-port device.

In another embodiment, a multi-port device includes a first port adapted to be selectively connected to a host device or a storage media device, wherein the first port is adapted to be configured as a slave port when connected to the host device and configured as a host port when connected to the storage media device; a second port adapted to be selectively connected to the host device, wherein the second port is adapted to be configured as a slave port; and a storage media device controller adapted to host the storage media device from the multi-port device when the host device is connected to the second port and the storage media device is connected to the first port.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

In accordance with embodiments further discussed herein, various techniques are provided for selectively operating multi-port devices as a slaves to connected host devices and/or as hosts to connected storage media devices. For example, in one embodiment, a multi-port device may operate as a slave to a host device connected through a USB port or an eSATA port of the multi-port device. In such an embodiment, if the host device is connected through the USB port, then the multi-port device may host another device (e.g., an external storage media device) connected through the eSATA port of the multi-port device. As a result, both the USB port and the eSATA port of the multi-port device may be utilized. In particular, the eSATA port (e.g., the port that is not connected to the host device) may be used to provide additional features that would otherwise be unavailable in conventional multi-port devices.

In one embodiment, the multi-port device may be implemented as a storage media device enclosure that is external to a host device. In this regard, the storage media device enclosure may include a local storage media device that may be accessed by a host device connected to the storage media device enclosure through a USB port. The storage media device enclosure may also operate as a host to an additional storage media device connected to the storage media device enclosure through an eSATA port. In this regard, the storage media device enclosure may facilitate the implementation of a redundant array of independent disks (RAID) array including, for example, the local storage media device and the additional storage media device. As a result, these storage media devices may be presented to the host device (e.g., an external computer) as a single storage media device.

Figure 1:
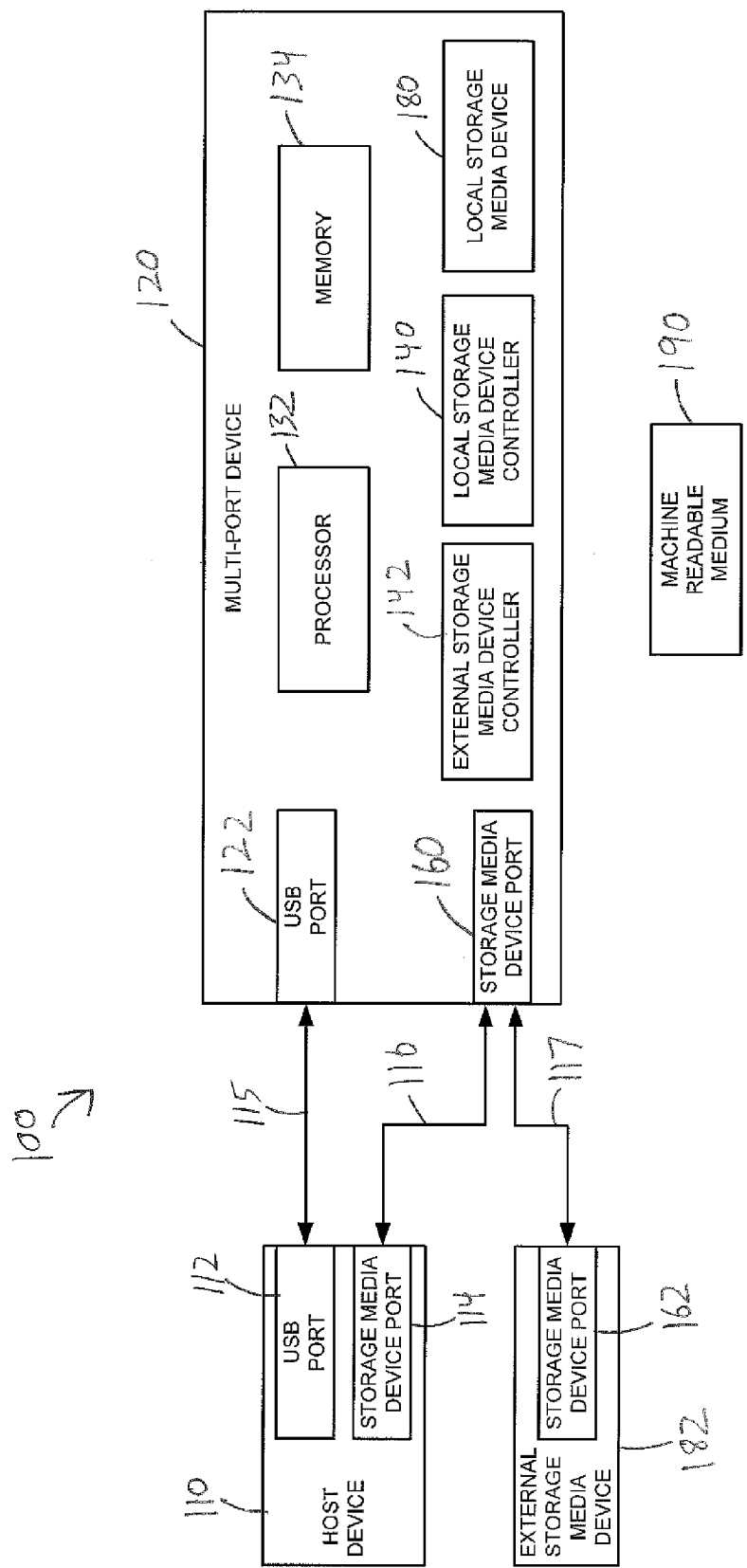
FIG. 1 illustrates a system including a multi-port device that may be selectively connected to a host device and/or a storage media device in accordance with an embodiment of the invention.

Referring now to the drawings which are provided for purposes of illustrating embodiments of the invention, and not for purposes of limiting the same, FIG. 1 illustrates a system 100 including a host device 110, a multi-port device 120, and a storage media device 182 in accordance with an embodiment of the invention. Host device 110 may be implemented, for example, by a programmable computer system, dedicated hardware, or other configurations. Multi-port device 120 may be implemented, for example, as a storage media device enclosure or any other appropriate device. Storage media device 182 may be implemented, for example, as a hard drive, flash drive (e.g., thumb drive, solid state drive, or others), optical storage media (e.g., CD-ROM, DVD, HD-DVD, Blu-Ray, or others), or any other appropriate storage media device.

Host device 110 may be configured to interface with multi-port device 120 through host ports 112 and 114 over buses 115 and 116. In one embodiment, host port 112 and bus 115 are implemented in accordance with USB 3.0 interface standards, and host port 114 and bus 116 are implemented in accordance with eSATA interface standards. In other embodiments, these components may be implemented in accordance with other interfaces such as, for example, USB 2.0, USB 1.0, Firewire, or others.

Storage media device 182 may be configured to interface with multi-port device 120 through a slave port 162 and a bus 117. In one embodiment, slave port 162 and bus 117 are implemented in accordance with eSATA interface standards. In other embodiments, these components may be implemented in accordance with other interfaces such as, for example, USB 2.0, USB 1.0, Firewire, or others.

Multi-port device 120 includes a slave port 122, a processor 132, a memory 134, a local storage media device controller 140, an external storage media device controller 142, a host/slave port 160, and a local storage media device 180.

Regarding ports 122 and 160, in one embodiment, slave port 122 may be implemented in accordance with USB 3.0 interface standards, and host/slave port 160 may be implemented in accordance with eSATA interface standards. In other embodiments, these components may be implemented in accordance with other interfaces such as, for example, USB 2.0, USB 1.0, Firewire, or others.

As shown in FIG. 1, host/slave port 160 may be connected to host port 114 of host device 110, or connected to slave port 162 of storage media device 182. In this regard, host/slave port 160 may operate as a slave port when connected to host device 110, and may operate as a host port when connected to storage media device 182.

As also shown in FIG. 1, slave port 122 may be connected to host port 112 of host device 110. In this regard, when multi-port device 120 is connected to host device 110 through slave port 122, multi-port device 120 may operate as a slave to host device 110.

Local storage media device 180 may be implemented, for example, as a storage media device maintained in multi-port device 120. For example, in one embodiment, local storage media device 180 may be implemented as any of the various types of storage media devices described herein with regard to external storage media device 182.

Processor 132 may be configured with appropriate software (e.g., a computer program for execution by processor 132) that is stored on a machine readable medium 190 (e.g., a CD-ROM or other appropriate storage media) and/or in memory 134 to instruct processor 132, local storage media device controller 140, external storage media device controller 142 and/or local storage media device 180 to perform one or more of the operations described herein with regard to multi-port device 120.

Local storage media device controller 140 may be used to interface with local storage media device 180 on behalf of host device 110. In this regard, host device 110 may access local storage media device 180 through local storage media device controller 140 when host device 110 is connected to multi-port device 120 through slave port 122 and/or through host/slave port 160. For example, in one embodiment, host device 110 may connect to multi-port device 120 through slave port 122. In another embodiment, host device 110 may connect to multi-port device 120 through host/slave port 160. In either case, local storage media device controller 140 may control local storage media device 180 on behalf of host device 110 (e.g., while multi-port device 120 operates as a slave to host device 110). In this regard, in various embodiments, local storage media device controller 140 may be implemented with appropriate hardware (e.g., one or more processors and/or memories), software, firmware, and/or other appropriate components to control local storage media device 180.

External storage media device controller 142 may be used to interface with external storage media device 182 on behalf of host device 110. In this regard, host device 110 may access external storage media device 182 through external storage media device controller 142 when host device 110 is connected to multi-port device 120 through slave port 122. In this regard, external storage media device controller 142 may control external storage media device 182 on behalf of host device 110 (e.g., while multi-port device 120 operates as a slave to host device 110). In this regard, in various embodiments, external storage media device controller 142 may be implemented with appropriate hardware (e.g., one or more processors and/or memories), software, firmware, and/or other appropriate components to control external storage media device 182 from multi-port device 120 in order to host external storage media device 182.

In one embodiment, local storage media device controller 140 and external storage media device controller 142 may be implemented as separate controllers as shown in FIG. 1. In another embodiment, local storage media device controller 140 and external storage media device controller 142 may be implemented by a single controller.

Figure 2:
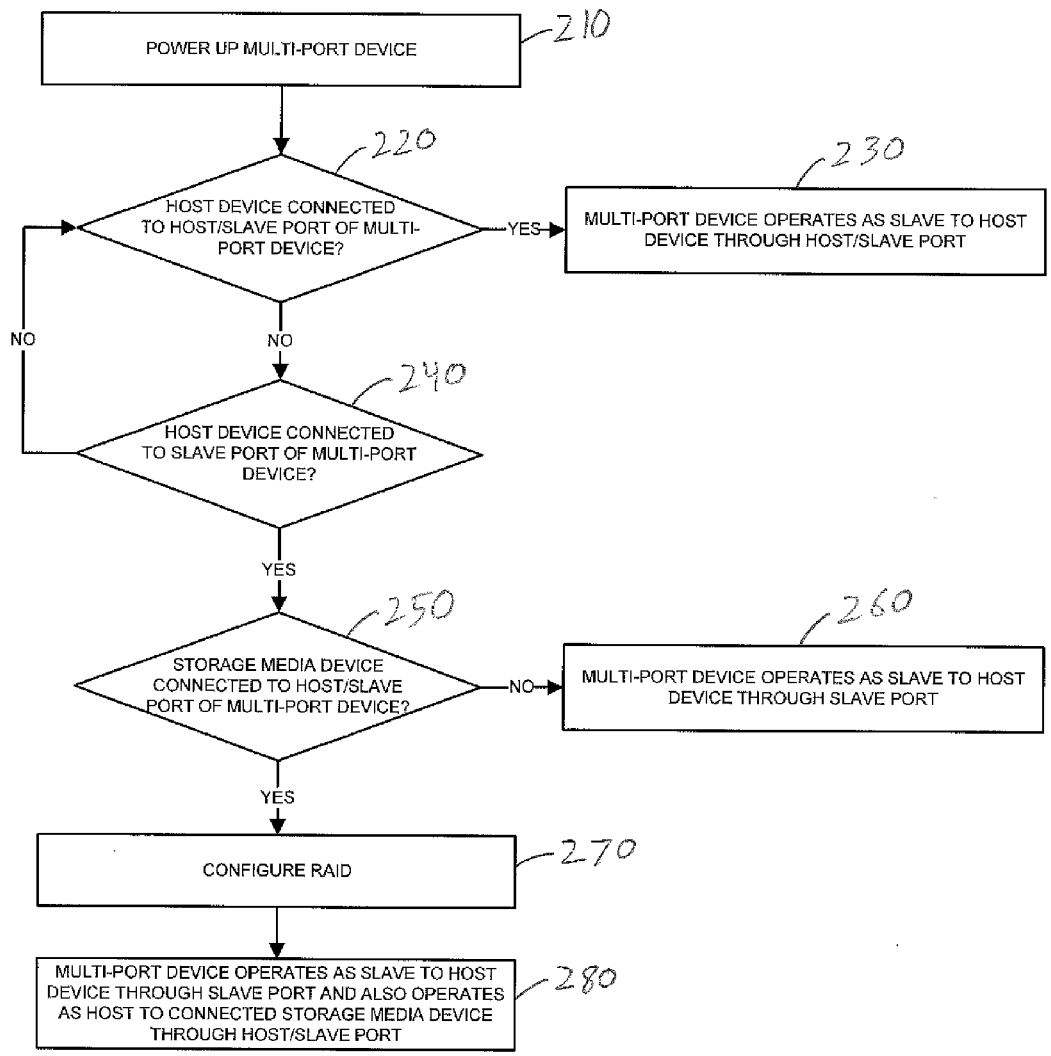
FIG. 2 illustrates a process of operating a multi-port device to host a storage media device in accordance with an embodiment of the invention.

FIG. 2 illustrates a process of operating multi-port device 120 to host external storage media device 182 in accordance with an embodiment of the invention. Multi-port device 120 is initially powered up (block 210), for example, in response to an operation by a user, a detected connection to host device 110, and/or any other appropriate operation.

Multi-port device 120 detects whether a host device such as host device 110 is connected to host/slave port 160 (block 220). For example, in one embodiment, external storage media device controller 142 and/or processor 132 may detect that host device 110 has established a communication link with multi-port device 120 (e.g., an eSATA communication link or other communication link) through host/slave port 160. In this case, host/slave port 160 may be configured to operate as a slave port and multi-port device 120 may operate as a slave to host device 110 through host/slave port 160 (block 230).

If host device 110 is not connected to host/slave port 160 (block 220), then multi-port device 120 detects whether host device 110 is connected to slave port 122 (block 240). If host device 110 is not connected to slave port 122 (block 240), then multi-port device 120 continues detecting whether host device 110 is connected to host/slave port 160 (block 220).

If host device 110 is connected to slave port 122 (block 240), then multi-port device 120 detects whether a storage media device such as external storage media device 182 is connected to host/slave port 160 (block 250).

If external storage media device 182 is not connected to host/slave port 160 (block 250), then host/slave port 160 may remain unused and multi-port device 120 may operate as a slave to host device 110 through slave port 122 (block 260).

If external storage media device 182 is connected to host/slave port 160 (block 250), then multi-port device 120 may operate as a host to external storage media device 182. For example, in one embodiment, multi-port device 120 may control external storage media device 182 as part of a RAID array that also includes local storage media device 180. In this regard, the combination of local storage media device 180 and external storage media device 182 may appear to host device 110 as a single storage media device while the management of the RAID array may remain hidden from host device 110. Such an implementation may permit multi-port device 120 to provide increased capacity, redundant storage, improved access times, and/or other advantages available in various RAID array configurations without requiring host device 110 to manage such configurations. Such RAID array configurations may be managed instead by processor 132, memory 134, local storage media device controller 140, external storage media device controller 142, and/or any desired combination of such components.

After detecting that external storage media device 182 is connected to host/slave port 160 (block 250), multi-port device 120 may configure the RAID array (block 270). The use of a RAID array is only one of many possible applications in which multi-port device 120 may operate as a host to other devices connected through host/slave port 160. Accordingly, other types of configuration operations may be performed in block 270 for other applications.

After the RAID array is configured (e.g., or any other appropriate configuration has been performed), multi-port device 120 may operate as a host to external storage media device 182 through host/slave port 160 (block 280). In this regard, external storage media device controller 142 may operate to control external storage media device 182 through host/slave port 160 while external storage media device 182 operates as a slave to multi-port device 120, and while multi-port device 120 operates as a slave to host device 110 through slave port 122.

The various implementations described herein in which host/slave port 160 connects external storage media device 182 to multi-port device 120 while slave port 122 connects multi-port device 120 to host device 110 provide a variety of advantages. For example, in one embodiment, appropriate operations may be performed by processor 132, memory 134, local storage media device controller 140, and/or external storage media device controller 142 to perform automated backups between local storage media device 180 and external storage media device 182 without requiring intervention by host device 110.

In another embodiment, appropriate operations may be performed by processor 132, memory 134, local storage media device controller 140, and/or external storage media device controller 142 to optimize storage media device data communications (e.g., data transfers) between local storage media device 180 and external storage media device 182. For example, multi-port device 120 may be configured to permit copying between local storage media device 180 and external storage media device 182 without requiring intervention by host device 110. Such an arrangement may improve such copying by, for example, approximately 50% over other arrangements that may pass such storage media device data communications from one of storage media devices 180 or 182 to host device 110 and back to the other one of storage media devices 180 or 182 for copying. In this regard, the hosting of external storage media device 182 by multi-port device 120 permits storage media device data communications to be routed between local storage media device 180 and external storage media device 182 without requiring management by host device 110 or interruption in communications between host device 110 and multi-port device 120 through ports 112 and 122.

In another embodiment, appropriate operations may be performed by processor 132, memory 134, local storage media device controller 140, and/or external storage media device controller 142 to use faster storage media devices 180 or 182 as caches for slower storage media devices. For example, if local storage media device 180 is implemented as a solid state drive and external storage media device 182 is implemented as a slower conventional hard drive, then local storage media device 180 may be used as a cache for external storage media device 182, thus improving performance.

In another embodiment, local and external storage media device controllers 140 and 142 may share the resources of other components of multi-port device 120, and materials costs (e.g., silicon costs) may be reduced in comparison with other embodiments in which local and/or external storage media device controllers 140 and 142 are not integrated with multi-port device 120.

Although particular ports such as USB ports and eSATA ports have been described, other types of ports/interfaces may be used where appropriate. For example, in various embodiments, ports/interfaces compatible with various types of protocols may be used such as SATA interfaces, Parallel Advanced Technology Attachment (PATA) interfaces, flash memory interfaces, Firewire interfaces, and/or others.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more machine readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method of operating a multi-port device, the method comprising:
    detecting whether a host device or a storage media device is connected to a first port of the multi-port device or a second port of the multi-port device;
    if the host device is connected to the first port, configuring the first port as a slave port and operating the multi-port device as a slave hosted by the host device; and
    if the host device is connected to the second port and the storage media device is connected to the first port, configuring the first port as a host port and hosting the storage media device from the multi-port device.

2. The method of claim 1, further comprising interfacing with the storage media device on behalf of the host device.

3. The method of claim 1, further comprising performing a data transfer between the storage media device and the host device through the multi-port device.

4. The method of claim 1, wherein the storage media device is an external storage media device, wherein the multi-port device comprises a local storage media device.

5. The method of claim 4, further comprising performing a data transfer between the external storage media device and the local storage media device without interrupting communications between the host device and the multi-port device.

6. The method of claim 4, further comprising interfacing with the local storage media device on behalf of the host device.

7. The method of claim 4, wherein the external storage media device and the local storage media device are part of a redundant array of independent disks (RAID).

8. The method of claim 1, wherein the first port is an external Serial Advanced Technology Attachment (eSATA) port.

9. The method of claim 1, wherein the second port is a Universal Serial Bus (USB) port.

10. The method of claim 1, wherein the multi-port device is a storage media device enclosure external to the host device.

11. The method of claim 1, wherein the storage media device is a hard drive.

12. A multi-port device comprising:
 a first port configured to be selectively connected to a host device or a storage media device, wherein the first port is configured to be configured as a slave port when connected to the host device and configured as a host port when connected to the storage media device;
 a second port configured to be selectively connected to the host device, wherein the second port is configured to be configured as a slave port; and
 a storage media device controller configured to host the storage media device from the multi-port device when the host device is connected to the second port and the storage media device is connected to the first port.

13. The multi-port device of claim 12, wherein the storage media device controller is configured to interface with the storage media device on behalf of the host device.

14. The multi-port device of claim 12, wherein the multi-port device is configured to perform a data transfer between the storage media device and the host device through the multi-port device.

15. The multi-port device of claim 12, wherein the storage media device is an external storage media device, the multi-port device further comprising a local storage media device.

16. The multi-port device of claim 15, wherein the storage media device controller is configured to perform a data transfer between the external storage media device and the local storage media device without interrupting communications between the host device and the multi-port device.

17. The multi-port device of claim 15, wherein the storage media device controller is configured to interface with the local storage media device on behalf of the host device.

18. The multi-port device of claim 15, wherein the storage media device controller is a first storage media device controller, the multi-port device further comprising a second storage media device controller, wherein the second storage media device controller is configured to interface with the local storage media device on behalf of the host device.

19. The multi-port device of claim 15, wherein the external storage media device and the local storage media device are part of a redundant array of independent disks (RAID).

20. The multi-port device of claim 12, wherein the first port is an external Serial Advanced Technology Attachment (eSATA) port.

21. The multi-port device of claim 12, wherein the second port is a Universal Serial Bus (USB) port.

22. The multi-port device of claim 12, wherein the multi-port device is a storage media device enclosure external to the host device.

23. The multi-port device of claim 12, wherein the storage media device is a hard drive.

* * * * *